United States Patent
Boese et al.

(10) Patent No.: US 7,620,711 B2
(45) Date of Patent: Nov. 17, 2009

(54) METHOD OF USING CONFIGURATION FILES FOR CONFIGURING TECHNICAL DEVICES

(75) Inventors: Jan Boese, Eckental (DE); Martin Kleen, Furth (DE); Norbert Rahn, Forchheim (DE)

(73) Assignee: Siemens Aktiengesellschaft, Munich (DE)

( * ) Notice: Subject to any disclaimer, the term of this patent is extended or adjusted under 35 U.S.C. 154(b) by 588 days.

(21) Appl. No.: 11/375,987

(22) Filed: Mar. 15, 2006

(65) Prior Publication Data

US 2006/0208931 A1  Sep. 21, 2006

(30) Foreign Application Priority Data

Mar. 18, 2005  (DE) ...................... 10 2005 012 697

(51) Int. Cl.
*G06F 15/173* (2006.01)
(52) U.S. Cl. .................. 709/223; 709/219; 705/51; 705/57; 705/59; 707/7; 707/204
(58) Field of Classification Search .............. 709/223, 709/219–221; 705/51, 59; 725/5, 8; 707/7, 707/204
See application file for complete search history.

(56) References Cited

U.S. PATENT DOCUMENTS

| | | | | |
|---|---|---|---|---|
| 5,948,061 A | * | 9/1999 | Merriman et al. | 709/219 |
| 6,882,840 B2 | * | 4/2005 | Fujiwara | 455/432.3 |
| 7,287,257 B2 | * | 10/2007 | Meza | 719/321 |
| 7,316,032 B2 | * | 1/2008 | Tayebi et al. | 705/51 |
| 7,334,023 B2 | * | 2/2008 | Koba et al. | 709/213 |
| 7,366,996 B2 | * | 4/2008 | Hoyle | 715/854 |
| 7,523,111 B2 | * | 4/2009 | Walmsley | 707/9 |
| 2005/0091160 A1 | * | 4/2005 | Kitze et al. | 705/40 |
| 2005/0144016 A1 | * | 6/2005 | Hewitt et al. | 704/278 |

FOREIGN PATENT DOCUMENTS

EP   1 513 311 A1   3/2005
WO   WO 99/22491 A1   5/1999

OTHER PUBLICATIONS

Michel Mouly, Marie-Bernadette Pautet, "The GSM System for Mobile Communications", Nov. 1992, pp. 584-585, Europe Media Duplication S.A., France.

* cited by examiner

*Primary Examiner*—Kenny S Lin
*Assistant Examiner*—Duyen Doan

(57) ABSTRACT

Method for the provision and use of configuration files for configuring technical devices.

The present invention relates to a method for the provision and use of configuration files containing essential configuration data for configuring technical devices. With the method the configuration data is uploaded by one or more participants in the method via a network onto a server and downloaded by users of the technical devices as configuration files from the server via the network. When a configuration file is downloaded by a user or when a downloaded configuration file is used by a user to configure a technical device, the participant who uploaded the configuration data of the downloaded or used configuration file onto the server receives a reimbursement. The present method simplifies the configuration of units for the users of technical devices and represents an incentive for experienced users to make the configurations they have created themselves also available to other users.

7 Claims, 2 Drawing Sheets

METHOD OF USING CONFIGURATION FILES FOR CONFIGURING TECHNICAL DEVICES

CROSS REFERENCE TO RELATED APPLICATIONS

This application claims priority to the German Application No. 10 2005 012 697.9, filed Mar. 18, 2005 which is incorporated by reference herein in its entirety.

FIELD OF INVENTION

The present invention relates to a method for the provision and use of configuration files, which contain configuration data essential for configuring technical devices.

BACKGROUND OF INVENTION

The configuration options for technical products are becoming increasingly complex as a result of technical progress. On the other hand with medical devices for example it is necessary to keep the complexity of the user interface as low as possible to allow the user to concentrate on their actual work. Where there are a very large number of configuration options, this can be achieved by offering the user a selection of already compiled configurations, which both configure the device in an optimum manner and meet user-specific requirements to the best possible degree. An optimum configuration is thereby a function of country-specific parameters, the qualifications, experience and preferences of the user working with the device and many other basic conditions, such as medical issues in the medical field for example. A configuration refers to a set of parameter values, which can be set by the user at the user interface of the device or can be read by the device via a suitable interface to set the device.

SUMMARY OF INVENTION

In many instances devices today are supplied with a default configuration, which can be changed by the user themselves or by a service engineer based on the user's parameters. In the field of medical devices at least the user is frequently also able to select from a number of predefined configurations displayed on a screen in a type of gallery via a graphic user interface. The user can thereby also create their own configurations and include them in their collection. However the creation of one or a number of individual configurations is frequently a very complex process for the user.

An object of the present invention is to specify a method for the provision and use of configuration files for configuring technical devices, which facilitates configuration for the user of a configurable technical device.

The object is achieved by the claims. Advantageous embodiments of the method are set out in the dependent claims or will emerge from the description which follows and the exemplary embodiments.

With the present method for the provision and use of configuration files, which contain configuration data essential for configuring technical devices, the configuration data can be uploaded by one or more participants in the method via a network onto a server and can be downloaded from the server via the network as configuration files by users of the technical devices for configuration of the technical devices. The participants in the method thereby preferably also represent users, who have to configure corresponding technical devices. With the present method the configuration files can be different types of file, for example even pure text files, in which the individual configuration data elements, i.e. the parameter values, are set out. These are preferably configuration files, which can be read by the corresponding devices themselves via appropriate interfaces, in order to automatically adopt or adjust the parameters values specified in the configuration files. They can also be executable files, which configure the corresponding technical device accordingly when the file is downloaded. The present method is therefore not limited to a specific type of file. The content of a configuration file can therefore, if the file is of a suitable type, be displayed by the user who downloaded it from the server, on a screen at said user's local workstation, so that said user is able to input the configuration data manually at a corresponding user interface with the technical device.

The participation of a number of users or other participants in the present method therefore allows a database to be made available on the server, from which users can make a selection from a number of configuration files for different requirements and download or retrieve the respective configuration files, in order to be able to use them without further time-consuming configuration outlay to configure their own technical device.

The particular nature of the present method is that when a user downloads a configuration file or when a user uses a downloaded configuration file to configure a technical device, optionally after a temporally defined evaluation phase of the configuration, the user who uploaded the configuration data of the downloaded or used configuration file onto the server receives a reimbursement. This compensates the participant on the one hand for the time spent creating a configuration and on the other hand provides an incentive to make such configurations they have created themselves also available to other users. Only with such an incentive can an adequate number of different configuration files be achieved in the database or on the server.

With the present method the (up)loading of configuration data or files and the downloading of the configuration files or their use is monitored, in order to calculate the associated reimbursement and to be able to credit the participants involved. Different mechanisms are possible for this process, which are known from the prior art from other internet-based applications, e.g. internet shopping or internet libraries. The participants or users can for example register before they use the database, so that access to the server is only possible by inputting an individual password, which identifies the participant or user in each instance.

In one embodiment of the present invention the user downloading a configuration file from the server or database thereon is charged a usage fee for the use of the configuration file. It is also possible not to charge this usage or license fee immediately when a configuration file is downloaded, only charging it when the configuration file is used to configure a technical device. This can also take into account a test or evaluation phase, of for example 10 working days, within which use of the configuration does not initiate the charging of the usage fee. The usage fee is only charged in the event of longer use. This can be effected for example by means of a switch in the configuration file, which links further use to the inputting of a license number by the user, the user only obtaining said number on payment of the usage fee. This can be a one-off usage fee for permanent licensing or ongoing usage fees, extending the use of the configuration for a defined period in each instance. Such licensing models are known from the field of commercial software programs.

In the last-mentioned embodiment the participant, who created the downloaded or subsequently used configuration, receives at least some of the usage fee that the user has to pay. The operator of the server or the database provided on the server (service provider) also preferably retains part of this usage fee.

In an alternative embodiment of the method users have the option, as with subscriptions, to download and use configuration files from the database in a restricted or unrestricted manner after a one-off payment. The reimbursement for participants is then calculated from the one-off payments made based on the number of downloads or uses relating to their configuration files. The distribution key for distribution of the usage fees collected to the participants can be predefined in any manner and is not the subject of the present invention.

In a further embodiment of the present invention the configuration files present in the database can also be supplied to users free of charge for downloading and use. In this instance the reimbursement for participants and, where applicable, the operator of the database is financed by advertising, which is overlaid on the internet interface, which is made available for downloading and uploading the configuration files. The configuration files provided in the database can also be exchanged without monetary reimbursement according to the principle of an exchange system between the participants and users. When a participant inputs a new configuration into the database, they are entitled to download and use a configuration already present in the database free of charge.

The network, via which access is obtained for uploading and downloading the configurations to or from the server, is preferably the internet. Naturally any local networks, for example WLAN or a connection via other information transmission channels, e.g. mobile radio, satellite or the mains network (e.g. PowerNet) can be connected in between. Access to the internet via the mains network is particularly advantageous, when the technical device does not have access to a local network (LAN) just a connection to the mains network. It is of course also possible to implement the entire method via a network without public access.

To prevent abuse of the present method, it is advantageous if it is verified before a configuration uploaded onto the server by a participant is provided, whether this configuration is already present in the database on the server. If this is so, it is a duplicate of a configuration that has already been used and it cannot be input into the database. In an extension of this method variant, it is also verified whether the uploaded configuration only differs by slight changes from configurations already present in the database. This can be done by predefining specific limit values for differences between the individual parameter values of the configurations. Of course other algorithms can also be used, which can identify similar configurations. Inputting into the database is not permitted in this instance either. This restriction can prevent a user uploading a configuration from the database and then inputting it back into the database after slight modification as a new configuration, to benefit financially from this procedure.

An information element is preferably linked to every configuration file and stored on the server, containing a reference to the identity of the participant who uploaded the configuration file onto the server. The product name and/or the version of the device that can be configured using the configuration file and/or a designation of all parameters, which can be set using the configuration file, are preferably stored on the server with a link to the configuration file and can be examined there by a user before downloading the configuration file.

Count information is also preferably linked to the configuration file and stored on the server, showing how often the configuration file has been downloaded by users since a specific date. The count information is updated each time the configuration file is downloaded. The corresponding count information is reset after a participant has been reimbursed based on said count information.

With the present method, configuration files that can be downloaded at a later time from the database can be created by the respective participant and then transmitted to the server. In an alternative embodiment only the defined parameter values are transmitted by the participant in a suitable form, for example as lists in a file that can be predefined in the format, to the server and converted there by a processing module, i.e. appropriate software, to a specific configuration file. This automatic creation of a configuration file from the configuration data transmitted by the participant has the advantage that it allows a file that can be read directly or uploade d by the respective technical device to be generated, the reading or uploading of which into the device immediately results in corresponding configuration of the device.

With the present method the individual configuration files are preferably stored in a device-specific or product and version-specific manner. This has the advantage for example that configurations of older versions stored in the database can be updated by the manufacturer to new product versions for example using automatic update tools. This ensures upward compatibility of configurations for the user. In addition to product and version-specific storage, it is also possible to store the configuration files according to other ordering criteria. For example unit configurations can be stored in the present database in a region-specific manner and can thus also be downloaded in a region-specific manner. The user can therefore specify the country of installation and upload a unit configuration that takes into account parameters/preferences relating to the language and legislation of the country as well as other region-specific parameter/preferences. Unit configurations that take into account different user preferences can be provided classified according to preferences.

The present method can be used to exchange configurations of technical devices between a number of users in a simple manner via a network, in particular the internet. Inexperienced users are thus able to benefit from the experience and know-how of advanced users. Product-specific user groups can also be formed, to exchange and discuss unit configurations. Setting up an exchange system to exchange configurations raises the level of knowledge of the product and increases customer loyalty. An exchange of configurations between the users of a device relieves users of the burden of having to configure their devices themselves according to their own requirements. They do not have to concern themselves with configuration-related problems. If configuration-specific problems arise, users can store their configuration in the database and have the configuration checked or optimized by the service department for example of a manufacturer or service provider. The central storage of configurations of the devices allows better service support for different product and version-specific configurations.

BRIEF DESCRIPTION OF THE DRAWINGS

The present method is described below again by way of example with references to exemplary embodiments in conjunction with the drawings without restricting the extent of protection predefined by the claims.

DETAILED DESCRIPTION OF INVENTION

Figure 1:
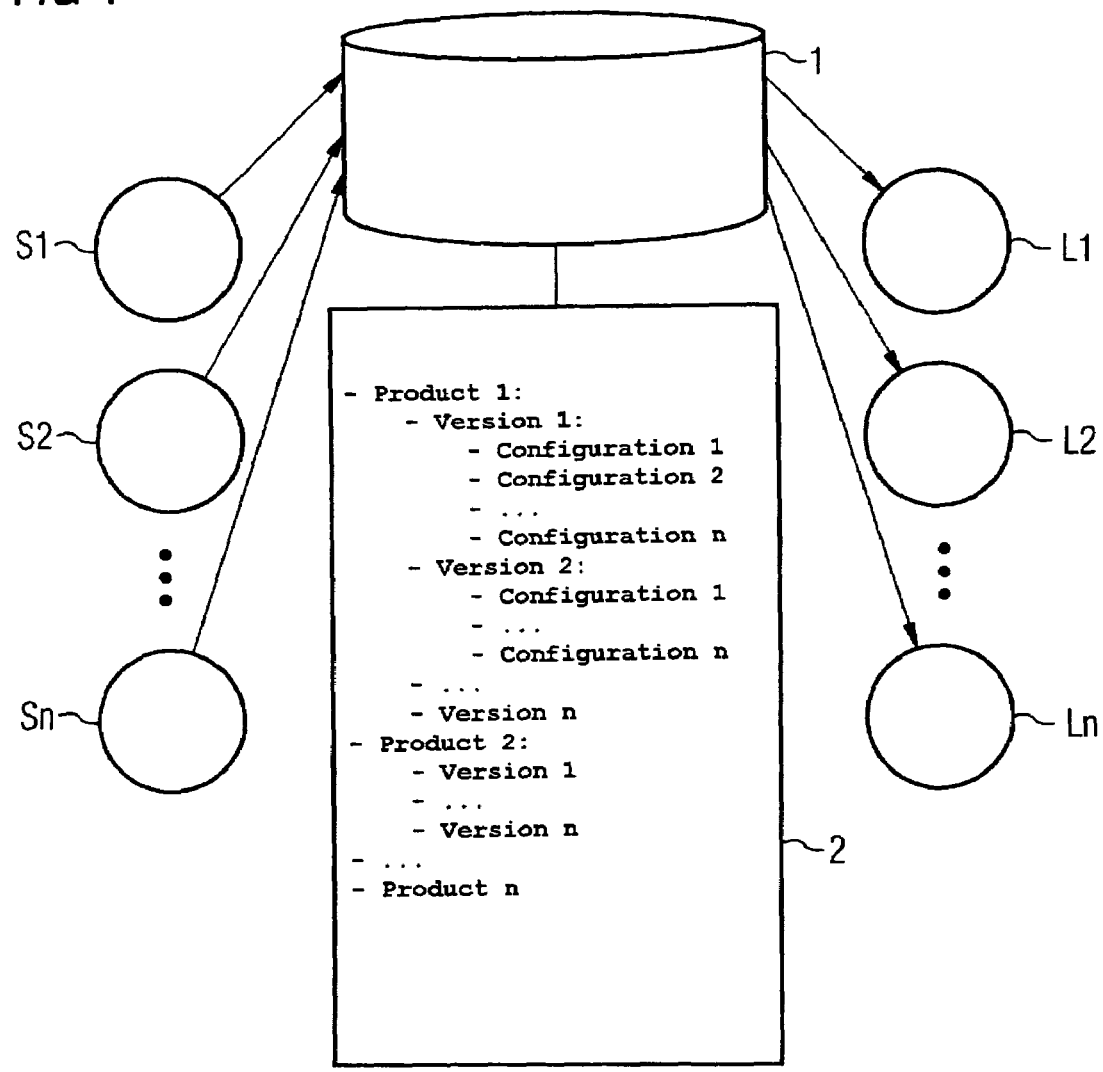
FIG. 1 shows a schematic diagram of the relationships between participants and users and the database provided on the server with the present method.

To this end FIG. 1 shows an internet-based database 1 available on a server, containing a pool 2 of unit configurations for different products (Product 1 . . . Product n) of different versions (Version 1 . . . Version n). Different users S1 to Sn, having corresponding units, make available their individually created unit configurations, by inputting these into the database 1 via the internet. On the other hand further users L1 to Ln can access the database 1 via the internet and select a configuration that is appropriate for their unit and their requirements and download it from the database. Both the uploading of the new configurations by the users S1 to Sn and the downloading by the users L1 to Ln is monitored by appropriate software on the server containing the database 1. This allows the users S1 to Sn to be reimbursed when the configurations provided by them are used by another user L1 to Ln. The users L1 to Ln in turn benefit from the configurations provided such that they do not have any configuration outlay themselves for configuring their units. In the present example these users have to pay a usage fee when they use a downloaded configuration and the creator of the configuration, i.e. one of the users S1 to Sn, receives a share of this fee.

Figure 2:
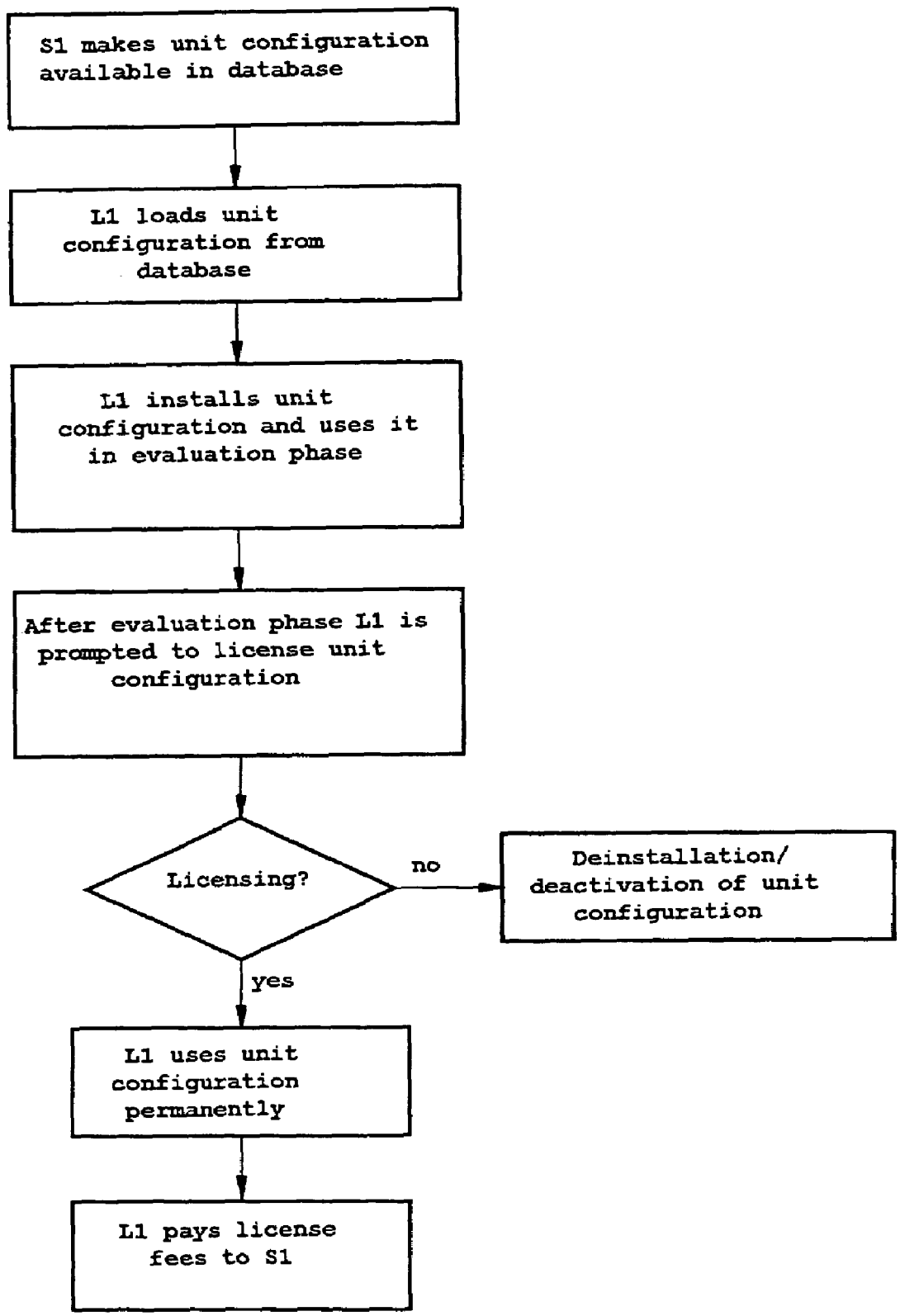
FIG. 2 shows an example of a sequence during the use of the present method.

This procedure is described again in more detail with reference to FIG. 2, in which a user S1 makes a unit configuration available in the form of a configuration file in the database 1, which is downloaded by another user L1 and used permanently to configure their unit. The user S1 stores the current unit configuration created by them, in other words the values of all configurable parameters of the configuration, in the internet-based database 1 via an internet interface. During this storage process the following data is also stored in the database 1, being provided in encrypted form by means of a standard electronic encryption method:

name of the user storing the unit configuration;
  product name and version of the product, for which the unit configuration can be used;
  all parameters of the unit configuration, by means of which the unit can be configured;
  bank details of the user for any subsequent reimbursement;
  optional: comments by the user, for example their contact address, descriptions of instances for which said unit configuration is particularly suitable, etc.

An identification character sequence (ID) is also issued with every newly stored unit configuration and this is used to license the unit configuration. A counter is also stored from that point, to show how often a unit configuration is uploaded and licensed by other users. This counter is used to reimburse license revenues.

Another user L1, looking for an appropriate configuration for their unit, accesses the database 1 and finds the unit configuration stored by the user S1 there. The user L1 downloads this unit configuration from the server and stores it on their unit to be configured, for example in a corresponding gallery of configuration files, as described briefly at the start of the description. The user L1 uses this gallery to select this unit configuration as the current unit configuration and installs said configuration. It can be a configuration file, which is automatically loaded and converted after being downloaded by the user of the unit.

In the present example the user L1 has a specific period for testing the configuration, i.e. an evaluation phase of for example 10 working days. At the end of this evaluation phase the license conditions for this unit configuration come into force. The user L1, who has installed the unit configuration, is informed of this after the end of the evaluation phase, in that they are prompted to license the unit configuration. The user can then accept the license conditions, after which they are charged license fees and these fees are either transferred directly to the user S1, who provided the unit configuration or to the service provider providing the database 1 and allowing its use. The transfer of license fees can for example take place according to known online payment systems, for example via a secure internet connection. If the fees are transferred to the service provider, the latter then reimburses the user S1, thereby also retaining some of the fees for the service provided.

If the user L1 does not accept the license conditions, this causes the unit configuration to be deactivated. Deactivation of the new unit configuration, which is now subject to licensing, is associated with restoration of the last used unit configuration on the unit of the user L1. Alternatively, in the context of the present method, the user L1 can select another unit configuration to operate the unit from the gallery, for which they have a valid license. This can be a unit configuration supplied by the manufacturer for example or a unit configuration uploaded from the database 1 and licensed by the user.

Some more examples of units are listed below, for which the present method can be used. One example is medical units, with which an internet-based exchange of unit configurations between users appears particularly expedient.

A first example relates to the layout of reporting systems. With reporting systems, e.g. the electro-physiological/hemodynamic reporting system AXIOM SENSIS® from Siemens Medical Solutions, Erlangen, a report is created, whereby the format of the report can be configured by means of a large number of configuration options, such that the layout of the report can be tailored in a user-specific manner. A very sophisticated configuration can be used to generate a very clear report format. Provision of the configuration of such a reporting form, the creation of which has involved a great deal of time and experience, according to the present method via an internet-based database offers significant advantages for the user.

A second example of use relates to the channel layout of recording systems for biosignal processing or patient monitoring. With recording or patient monitoring systems it is necessary to configure the layout of the biosignals displayed on a monitor. For users with little experience it is advantageous in this context to be able to benefit from experienced users according to the present method by adopting their layout configurations.

A third example relates to imaging in conjunction with organ programs. Medical imaging systems are equipped by the manufacturer with what are referred to as organ programs, i.e. image acquisition parameters are specifically set as a function of the imaged patient anatomy. These image acquisition parameters can be pulse sequences of a magnetic resonance tomograph or recording parameters of an X-ray system, an angiography system or a computed tomography system. These parameters can be varied by the user to enhance the image quality during acquisition—for example for particularly complex cases. This new parameterization can also be made available to other users by means of the present method.

A fourth example relates to post-processing during the subsequent processing of medical image data. During the subsequent processing of medical image data, parameters, for example organ-specific transfer functions for volume rendering, the generation of which is very time-consuming in many instances, are configured by the user. These configurations can also be exchanged between users according to the present method.

In addition to medical applications, the present method can also be used in many other technical fields. One example is the configuration of computer systems or computer applications. Computer systems or their operating systems and applications have very diverse and in some instances not readily accessible configuration options. It can therefore be very helpful to the user when using the present method to be able to load standard configurations from the internet-based database and exchange these with other users. The internet interface for access to the database already exists in this instance.

A further example is the configuration of mobile telephones. Mobile telephones can be configured in diverse ways. It is correspondingly complex for the user to configure the mobile telephone according to their preferences. With new internet-based technologies the mobile telephone also has access to the internet, such that it is possible to use the present method, i.e. the storage, downloading and exchange of configurations for the mobile telephone, in this instance without any problem.

A further application of the present method relates to products from the field of home entertainment equipment. Such products are often complex to configure. The configuration of such products by means of loadable unit configurations is significantly simpler for the inexperienced user. The experienced user configuring their devices using sophisticated loadable configurations benefits by exchanging configurations with other experienced users or by the financial benefit resulting from providing unit configurations they have created themselves. Thus products such as radio devices, television devices, video recording and playback devices, games industry devices (e.g. Game Boys) or camera recording systems for example can be configured by downloading and loading a unit configuration from the internet-based database according to the present invention. In the case of radio devices, the configuration can include the region/country-specific channel layout. This is also true of television devices, for which different configurations are possible depending on user preference, manufacturer defaults or the configuration of layout characteristics of the operator interface or menu guide. These configuration options are also possible for video recording and playback devices and games industry devices. Different configurations are also possible for camera recording systems, such as video cameras, depending on user preference or manufacturer defaults. The configuration of layout/characteristics of the operator interface or menu guide and of defaults for recording parameters or camera characteristics is also possible with such systems.

A further example relates to products from the field of traffic engineering or vehicle construction. In the case of automobiles, drive characteristics, travel characteristics, e.g. comfortable or sporty drive responses, or the layout of fittings, e.g. background/foreground layout/illumination can therefore be configured. Similar configuration options are possible for motorcycles, rail vehicles or aircraft. These configurations can also be provided and used according to the present method.

A further example relates to products from the field of semiconductor electronics. Semiconductor electronics modules are frequently complex to configure/program. It can be significantly simpler for the user or designer using such modules to be able to load prefabricated configurations for a specific semiconductor module from the internet database. These configurations can contain combined, module-specific information, such as the configuration of ports, timers, interfaces, operating modes, reset responses, drivers, loadable EPROM software, etc.

Products from the field of industrial units/energy generation/energy transmission/energy consumption engineering can also be configured with the present method. Such unit configurations that can be loaded from a central database are also of major benefit in industrial and building systems. Both the overall configuration of a unit as well as of components and their sub-components can be provided and used in the context of the present invention.

The same applies to products from the everyday/office/leisure/sport field, for example the configuration of (radio) clocks or weather stations, electronic sport articles such as ergometers or pulse meters or scanners or copiers.

A further example is unit configurations, which configure networking characteristics. A networking solution made up of sub-components can often be configured in many ways in respect of the components used and the resulting interfaces between these components. The large number of variations and the complexity of the configuration of a networking solution mean that the downloading of an existing, functioning configuration is a simpler option for the user/manufacturer of such a networking solution. The present method can therefore also be used advantageously for the provision and use of networking configurations. The configuration allows the role, for example client or server, master or slave, of the individual components of the networking solution to be defined. Specific characteristics, for example the nature of the interface used, specification of the transmittable and receivable protocols, the implementation of standards, etc., of the individual components of the networking solution can also be configured.

The invention claimed is:

1. A method of sharing configuration files having configuration data essential for configuring technical devices among users of the technical devices, the method comprising:

receiving configuration data onto a server uploaded via a network by at least one user, wherein said configuration data comprises a plurality of parameter values for configuring a technical device and wherein said configuration data is associated with the user who uploaded the configuration data, and wherein said configuration data is further associated with an information element about the configuration data;

storing the configuration data on a database of the server only after verifying that the configuration data is not already present in the database by checking for duplication comprising comparing the individual parameter values of the configuration data with predefined limit values and rejecting configuration data determined to be a duplication, and wherein the configuration data is organized in a region-specific manner to allow for downloading in a region-specific manner upon specifying a region;

providing to an end user access to the information element about the configuration data and access to the configuration data for download by the end user in a region-specific manner;

receiving a selection by the end user of the configuration data to download;

upon downloading of the configuration data by the end user, updating a counter associated with the configuration file to monitor downloads in order to calculate an associated reimbursement to the user who uploaded the configuration data wherein the associated reimbursement is based on the number of downloads of the configuration data and payment by the end user.

2. The method according to claim 1, wherein the end user is provided with a free evaluation period to use the configuration data before payment is required, wherein should the end user choose keep using the configuration data after the evaluation period, payment is required from the end user and the user who uploaded the configuration data is reimbursed, and should the end user choose not to keep using the configuration data after the evaluation period, payment is not required and the user who uploaded the configuration data is not reimbursed.

3. The method according to claim 1, wherein the reimbursement at least partially includes the advertisement fee.

4. The method according to claim 1, wherein the information element is readable by the end user, the further information element including a product name or a version of such technical device configurable by the configuration data or a listing of such parameters adjustable by the configuration data.

5. The method according to one of claim 1, further comprising an identification character sequence automatically assigned to each uploaded configuration data and used to license the configuration data to end users.

6. The method according to claim 2, wherein the configuration files having the configuration data include a verification mechanism requiring the end user to input a license identification number after lapse of the free evaluation period in order to keep using the configuration data.

7. The method according to claim 1, wherein the server is configured to automatically generate a configuration files based on the uploaded configuration data, wherein the configuration file comprises a text file, a config file, or an executable file.

* * * * *

UNITED STATES PATENT AND TRADEMARK OFFICE
CERTIFICATE OF CORRECTION

PATENT NO. : 7,620,711 B2  Page 1 of 1
APPLICATION NO. : 11/375987
DATED : November 17, 2009
INVENTOR(S) : Boese et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 835 days.

Signed and Sealed this

Twenty-sixth Day of October, 2010

David J. Kappos
*Director of the United States Patent and Trademark Office*